United States Patent
Zhou et al.

(10) Patent No.: US 10,530,836 B2
(45) Date of Patent: Jan. 7, 2020

(54) METHODS AND APPARATUSES FOR ACQUIRING IMAGE

(71) Applicant: Xiaomi Inc., Beijing (CN)

(72) Inventors: Shiquan Zhou, Beijing (CN); Qiang Fu, Beijing (CN); Enxing Hou, Beijing (CN)

(73) Assignee: Xiaomi Inc., Beijing (CN)

(*) Notice: Subject to any disclaimer, the term of this patent is extended or adjusted under 35 U.S.C. 154(b) by 20 days.

(21) Appl. No.: 15/179,588

(22) Filed: Jun. 10, 2016

(65) Prior Publication Data

US 2017/0126781 A1    May 4, 2017

(30) Foreign Application Priority Data

Oct. 29, 2015  (CN) .......................... 2015 1 0718591

(51) Int. Cl.
 *H01L 29/08* (2006.01)
 *H04L 29/08* (2006.01)

(52) U.S. Cl.
 CPC ............ *H04L 67/06* (2013.01); *H04L 67/306* (2013.01); *H04L 67/32* (2013.01)

(58) Field of Classification Search
 CPC ........ H04L 67/06; H04L 67/32; H04L 67/306
 USPC ...................................................... 709/219
 See application file for complete search history.

(56) References Cited

U.S. PATENT DOCUMENTS

| 7,103,315 B2 * | 9/2006 | Wilkinson .......... H04M 1/7253 455/3.06 |
| 8,782,285 B1 * | 7/2014 | Cassidy ......... H04N 21/234309 709/246 |
| 8,902,154 B1 * | 12/2014 | Kahn .................... G06F 1/1694 345/156 |
| 9,807,193 B2 * | 10/2017 | Brill ...................... H04L 67/306 |
| 2001/0021884 A1 | 9/2001 | Shinyagaito |
| 2004/0193648 A1 * | 9/2004 | Lai ..................... H04N 7/17318 |
| 2005/0021494 A1 * | 1/2005 | Wilkinson .......... H04M 1/7253 |

(Continued)

FOREIGN PATENT DOCUMENTS

| CN | 201110363349 | * | 3/2011 |
| CN | 102421012 A | | 4/2012 |

(Continued)

OTHER PUBLICATIONS

Extended European Search Report of European Application No. 16169059.9 dated Nov. 28, 2016 (8 pages).

(Continued)

*Primary Examiner* — David R Lazaro
*Assistant Examiner* — Berhanu Shitayewoldetadik
(74) *Attorney, Agent, or Firm* — Finnegan, Henderson, Farabow, Garrett & Dunner LLP (57) ABSTRACT

An image acquiring method includes: detecting whether a screenshot signal is triggered; sending a screenshot request to a server when the screenshot signal is triggered, the screenshot request including a user account and a target smart device identification, so as to enable the server to send the screenshot request to a target smart device based on the user account and the target smart device identification; and receiving a screenshot image from the server, the screenshot image being obtained by using the target smart device to perform a screenshot on an image displayed on the target smart device based on the screenshot request.

11 Claims, 8 Drawing Sheets

(56) References Cited

U.S. PATENT DOCUMENTS

| | | | |
|---|---|---|---|
| 2007/0214103 A1* | 9/2007 | Manthoulis | H04L 12/18 |
| 2008/0189395 A1* | 8/2008 | Stremel | G06F 17/30867 |
| | | | 709/219 |
| 2009/0264070 A1* | 10/2009 | Lim | G06Q 30/0261 |
| | | | 455/41.2 |
| 2010/0095345 A1 | 4/2010 | Tran et al. | |
| 2012/0069199 A1* | 3/2012 | Chang | G06K 9/00 |
| | | | 348/207.1 |
| 2013/0227456 A1 | 8/2013 | Lee et al. | |
| 2013/0311560 A1* | 11/2013 | Schleier-Smith | H04L 67/306 |
| | | | 709/204 |
| 2013/0339907 A1* | 12/2013 | Matas | G06T 11/60 |
| | | | 715/853 |
| 2014/0208207 A1 | 7/2014 | Li | |
| 2014/0253574 A1* | 9/2014 | Brown et al. | G06T 1/00 |
| | | | 345/545 |
| 2015/0207764 A1* | 7/2015 | He | H04L 51/04 |
| | | | 715/752 |
| 2015/0220814 A1* | 8/2015 | Verkasalo | G06Q 20/322 |
| | | | 382/103 |
| 2015/0286281 A1 | 10/2015 | Fang | |
| 2015/0294433 A1* | 10/2015 | Ye | G06T 1/0007 |
| | | | 345/418 |
| 2015/0304300 A1* | 10/2015 | Bender | H04L 12/1895 |
| | | | 726/4 |
| 2015/0347270 A1* | 12/2015 | Cheng | G06F 11/3612 |
| 2016/0072821 A1 | 3/2016 | Wu et al. | |
| 2016/0189267 A1* | 6/2016 | Velusamy | G06Q 30/0623 |
| | | | 705/26.61 |
| 2016/0197993 A1* | 7/2016 | Perkowski | H04L 67/1097 |
| | | | 709/203 |
| 2017/0126781 A1* | 5/2017 | Zhou | H04N 21/4126 |
| 2017/0230510 A1* | 8/2017 | Ji et al. | H04M 11/007 |
| | | | 455/419 |

FOREIGN PATENT DOCUMENTS

| | | |
|---|---|---|
| CN | 202444580 U | 9/2012 |
| CN | 103618706 A | 3/2014 |
| CN | 104244029 A | 12/2014 |
| CN | 104601698 A | 5/2015 |
| CN | 104967889 A | 10/2015 |
| EP | 2 690 849 A2 | 1/2014 |
| JP | 2001256156 A | 9/2001 |
| JP | 2009124337 A | 6/2009 |
| JP | 2009237687 A | 10/2009 |
| JP | 2013175183 A | 9/2013 |
| JP | 2014120117 A | 6/2014 |
| KR | 20140137642 A | 12/2014 |
| RU | 2534005 C2 | 11/2014 |
| WO | WO 2015/025277 A1 | 2/2015 |

OTHER PUBLICATIONS

International Search Report of PCT Application No. PCT/CN2015/099603, dated Jun. 21, 2016, issued by ISA/CN (11 pages).

English version of International Search Report of PCT Application No. PCT/CN2015/099603, dated Jun. 21, 2016, issued by the ISA/CN—State Intellectual Property Office of the P.R. China.

English version of International Preliminary Report on Patentability of PCT Application No. PCT/CN2015/099603, dated May 1, 2018.

Office Action in counterpart European Application No. 16 169 059.9-1209, dated Feb. 23, 2018.

* cited by examiner

METHODS AND APPARATUSES FOR ACQUIRING IMAGE

CROSS-REFERENCE TO RELATED APPLICATION

This application is based on and claims priority to Chinese Patent Application No. 201510718591.0, filed Oct. 29, 2015, which is incorporated herein by reference in its entirety.

TECHNICAL FIELD

The present disclosure is related to the field of Internet, and more particularly, to methods and apparatuses for acquiring an image.

BACKGROUND

Along with the development of the Internet, more and more smart devices, such as computers, smart TVs and the like, are provided with a display function. The frequency of the smart devices being used becomes increasingly high. In the use of the smart devices, users want to timely store images. An image acquiring method is needed to obtain those images.

In the related arts, when a smart device, such as a smart TV, is in use, a user can use a camera or a mobile phone to take a picture on the smart TV to obtain a desired image.

SUMMARY

According to a first aspect of the present disclosure, there is provided an image acquiring method. The method includes: detecting whether a screenshot signal is triggered; sending a screenshot request to a server when the screenshot signal is triggered, the screenshot request including a user account and a target smart device identification, so as to enable the server to send the screenshot request to a target smart device based on the user account and the target smart device identification; and receiving a screenshot image from the server, the screenshot image being obtained by using the target smart device to perform a screenshot on an image displayed on the target smart device based on the screenshot request.

According to a second aspect of the present disclosure, there is provided an image acquiring apparatus. The apparatus includes: a processor; and a memory configured to store instructions executable by the processor. The processor is configured to: detect whether a screenshot signal is triggered; send a screenshot request to a server when the screenshot signal is triggered, the screenshot request including a user account and a target smart device identification, so as to enable the server to send the screenshot request to a target smart device based on the user account and the target smart device identification; and receive a screenshot image from the server, the screenshot image being obtained by using the target smart device to perform a screenshot on an image displayed on the target smart device based on the screenshot request.

According to a third aspect of the present disclosure, there is provided an image acquiring apparatus. The apparatus includes: a processor; and a memory configured to store instructions executable by the processor. The processor is configured to: receive a screenshot request from a server; perform a screenshot on an image displayed on the image acquiring apparatus, based on the screenshot request to obtain a screenshot image; and send the screenshot image to the server.

It should be understood that both the foregoing general description and the following detailed description are only exemplary and explanatory and are not restrictive of the disclosure.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1:
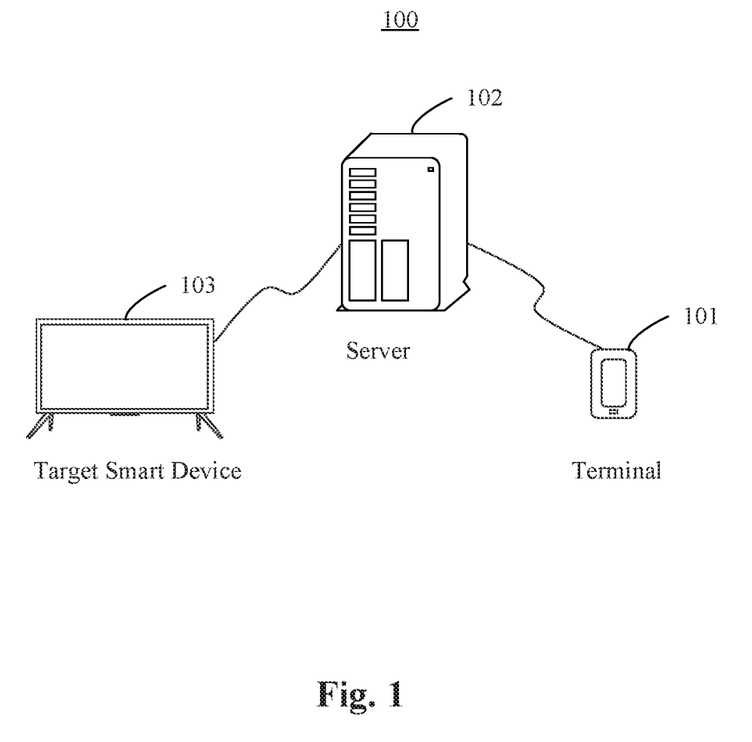
FIG. 1 is a block diagram showing an image acquiring system according to an exemplary embodiment of the present disclosure.

FIG. 1 is a block diagram showing an image acquiring system 100 according to an exemplary embodiment. As shown in FIG. 1, the system 100 includes a terminal 101, a server 102, and a target smart device 103. The terminal 101 and the server 102 are coupled to each other through a wireless or wired network. The server 102 and the target smart device 103 are coupled to each other through a wireless or wired network. The terminal 101 is installed with a smart home application, and communicates with the server 102 via the smart home application, so as to control the target smart device 103. The server 102 is configured to transmit signals between the terminal 101 and the target smart device 103. The target smart device 103 receives control information sent from the terminal 101 via the server 102, so as to perform a corresponding control operation.

Figure 2:
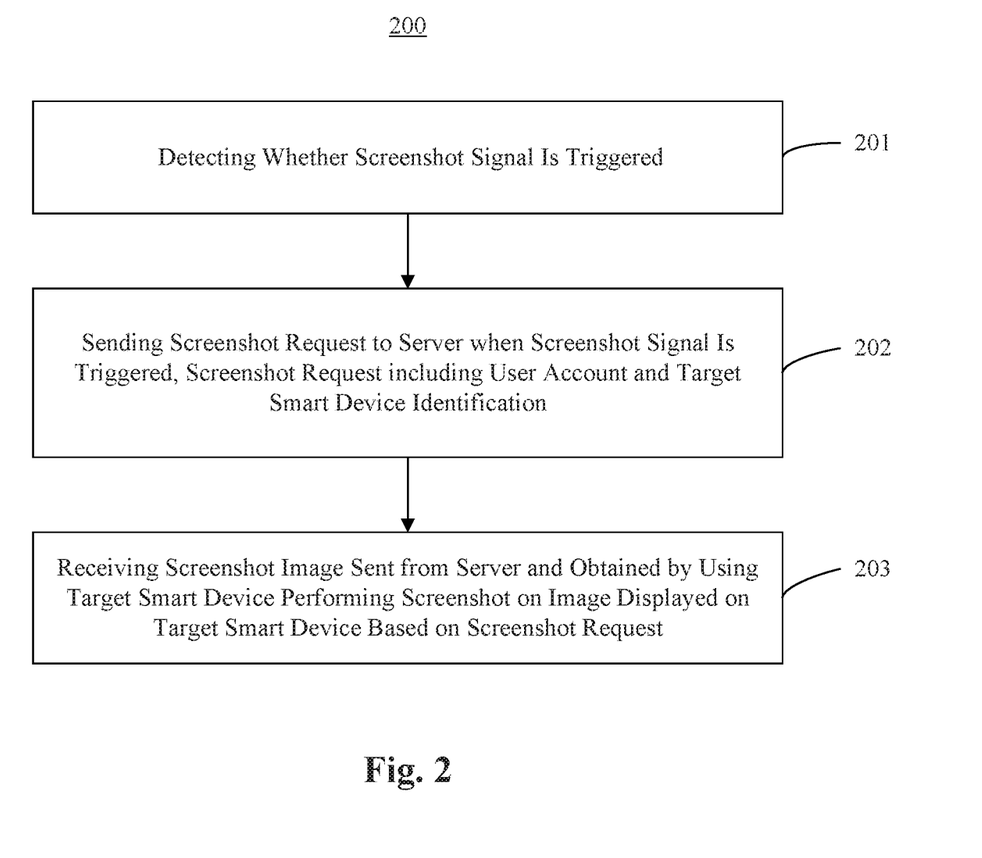
FIG. 2 is a flow chart showing an image acquiring method according to an exemplary embodiment of the present disclosure.

FIG. 2 is a flow chart showing an image acquiring method 200 according to an exemplary embodiment. The method 200 is performed by a terminal, such as the terminal 101 shown in FIG. 1. As shown in FIG. 2, the image acquiring method 200 includes the following steps.

In step 201, the terminal detects whether a screenshot signal is triggered.

In step 202, the terminal sends a screenshot request to a server when the screenshot signal is triggered. The screenshot request includes user account information of a user account used to log into an application installed in the terminal and a target smart device identification, so as to enable the server to send the screenshot request to the target smart device based on the user account and the target smart device identification.

In step 203, the terminal receives a screenshot image sent from the server and obtained by using the target smart device performing a screenshot on an image displayed on the target smart device based on the screenshot request.

In the illustrated embodiment, the terminal detects whether the screenshot signal is triggered. When the screenshot signal is triggered, the screenshot request is sent to the server to enable the server to send the screenshot request to the target smart device. The terminal receives a screenshot image from the server, so that a user can fast and accurately acquire an image which the user wants to acquire by triggering the screenshot signal when the user finds the image on the target smart device. The method 200 for acquiring an image is efficient to acquire an image the user desires to have.

In some embodiments, the detecting whether a screenshot signal is triggered includes: determining that the screenshot signal is triggered when an application, such as a smart home application, installed in the terminal receives an instruction to acquire a screenshot. The smart home application is logged in with a user account.

In some embodiments, the detecting whether a specified signal is triggered includes: determining whether the smart home application which is logged in with a user account is in a running state when a specified operation is detected; and determining that the screenshot signal is triggered when the smart home application is in the running state.

In some embodiments, the specified operation can be a shake operation, a knocking operation, or a specified hand gesture operation.

Consistent with embodiments of the present disclosure, all or a portion of the above embodiments can be combined, and the description thereof will not be repeated herein.

Figure 3:
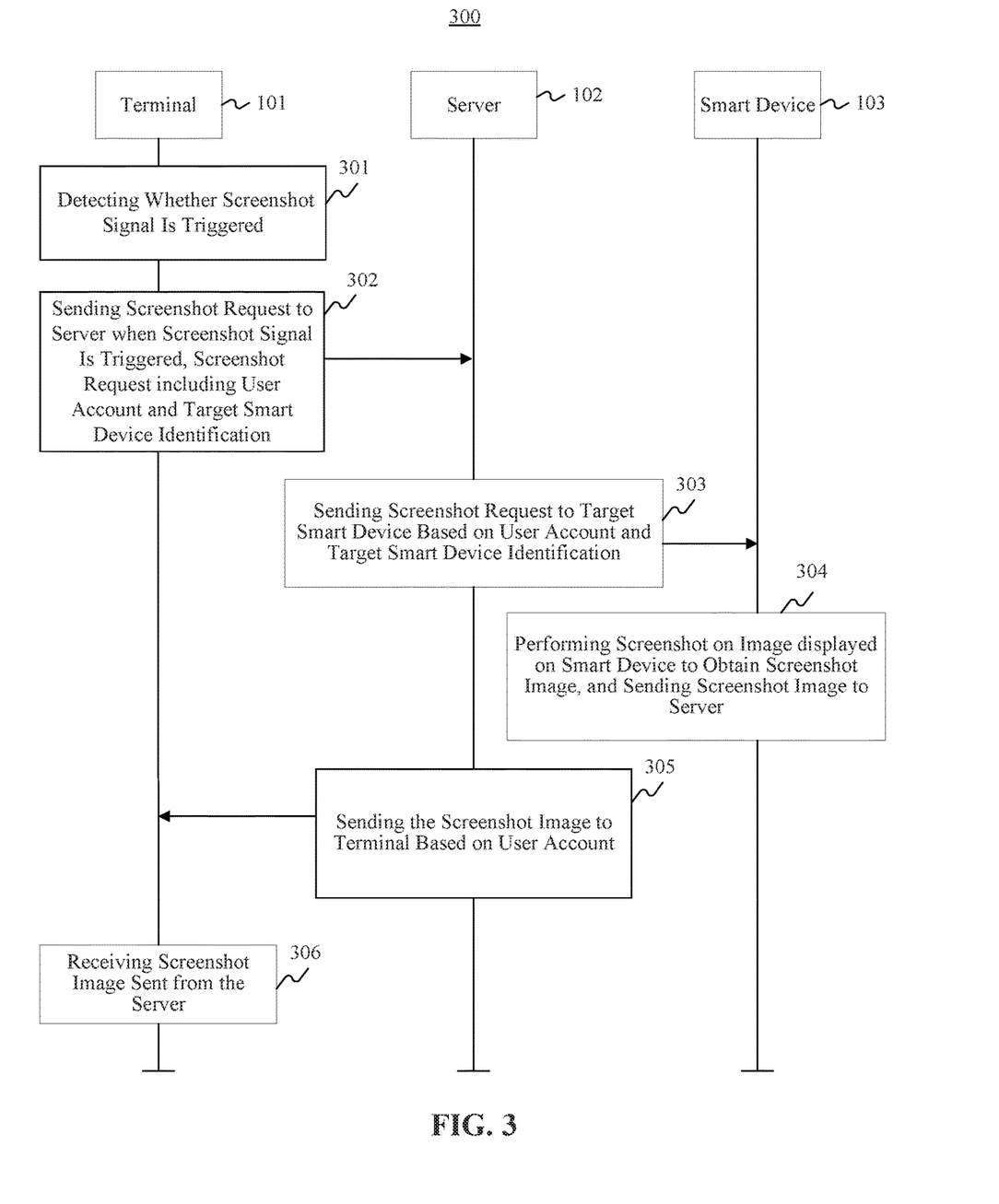
FIG. 3 is a flow chart showing another image acquiring method according to another exemplary embodiment of the present disclosure.

FIG. 3 is a flow chart showing another image acquiring method 300 according to an exemplary embodiment. The method 300 is performed by the terminal 101, the server 102, and the smart device 103 of the system 100 as shown in FIG. 1. As shown in FIG. 3, the image acquiring method 300 includes the following steps.

In step 301, the terminal 101 detects whether a screenshot signal is triggered in the terminal 101.

When a smart device, such as a computer, a smart TV, and the like with a display function is displaying images, a user of the terminal 101 may wish to timely store certain images that the user desires and are displayed on the smart device. To store the images, the terminal 101 can control the smart device 103 to perform a screenshot through, for example, a screenshot signal. In the illustrated embodiment, the terminal 101 can detect whether a screenshot signal is triggered in the terminal 101.

The terminal 101 may be a mobile phone or the like on which a smart home application can be installed, and can run the smart home application to detect whether the screenshot signal is triggered.

In some embodiments, the screenshot signal is triggered when the terminal 101 receives a screenshot instruction through the smart home application which is logged in with the user account. In some embodiments, the terminal 101 detects that the screenshot signal is triggered on the basis of determining whether the smart home application, which is logged in with the user account, is in a running state when the terminal 101 detects a specified operation. The terminal 101 determines that the screenshot signal is triggered when the smart home application is in the running state.

In the illustrated embodiment, the screenshot instruction is configured to control the smart device 103 to perform a screenshot on the image displayed on the smart device. The screenshot instructions may be triggered by a user via a predetermined operation which may be, for example, a voice operation, a touch operation, or a hand gesture operation. The predetermined operation that is used to trigger the screenshot instruction is not limited to these examples, and can be other operation capable of being detected by the terminal 101.

In some embodiments, the predetermined operation may be, for example, a shake operation, a knocking operation, a specified hand gesture operation, or a key operation. The present disclosure is not limited to these examples.

In some embodiments, when the predetermined operation is detected and the smart home application is in off state, prompt information can be displayed on the terminal 101, to prompt the user that the predetermined operation is detected and to determine whether to run the smart home application. The terminal 101 can start and run the smart home application when receiving a run instruction based on the prompt information, so as to determine that the screenshot signal is triggered. However, the terminal 101 can determine that the screenshot signal is not triggered when receiving an instruction not to run the smart home application, based on the prompt information.

In some embodiments, the prompt information can be displayed on the terminal in, for example, a display window or in other manners, such as a pop-up window. The present disclosure is not limited to these examples.

In some embodiments, an operation instruction is configured to control the terminal to run the smart home application, and the deny-operation instruction is configured to control the terminal not to run the smart home application. The operation instruction and the deny-operation instruction can be triggered by the user via predetermine operations.

Figure 4:
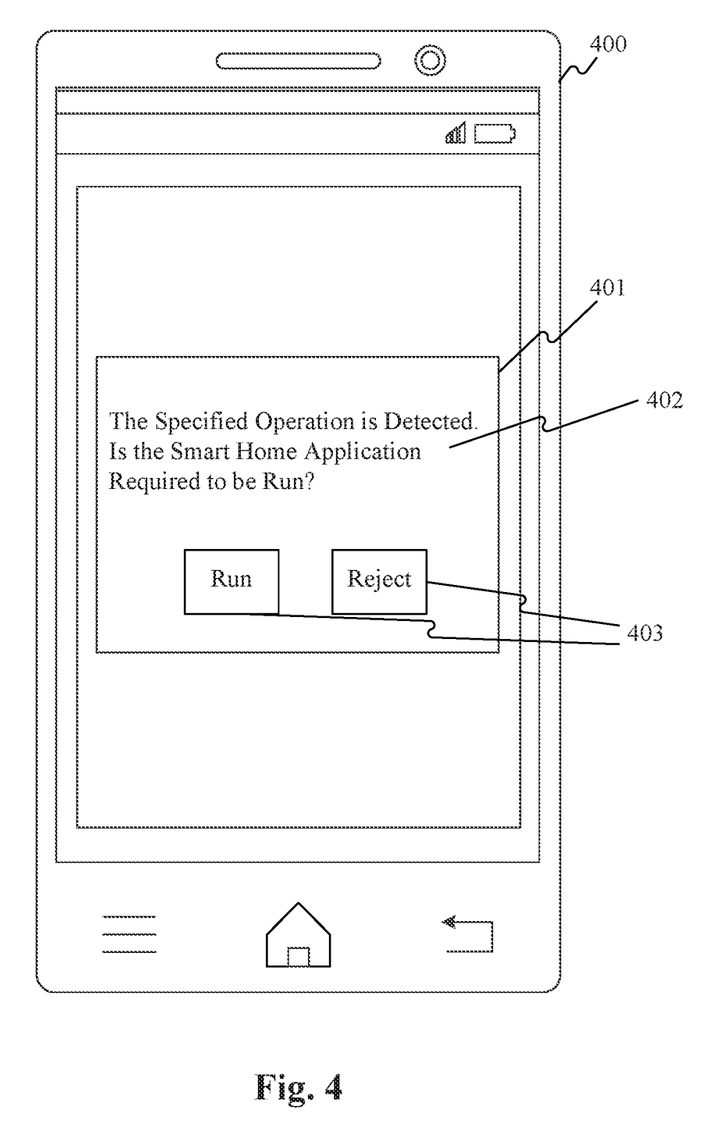
FIG. 4 illustrates a terminal displaying a display interface according to an exemplary embodiment of the present disclosure.

In one embodiment, when the terminal 101 detects a predetermined operation and determines that the smart home application is in the off state. FIG. 4 illustrates a terminal 400 having a display interface 401 displaying a piece of prompt information 402. Referring to FIG. 4, the prompt information 402 displayed on the terminal 400 can be "The Specified Operation is Detected. Is the Smart Home Application Required to be Run?" The interface 401 on which the prompt information 402 is displayed may further include selections regions 403, for example, of "Run" and "Reject". A touch or press on the "Run" or "Reject" region trigger a run and do-not-run instruction, respectively.

In step 302, the terminal 101 sends a screenshot request to the server 102 when the screenshot signal is triggered. The screenshot request includes a user account and a target smart device identification. The user account is used to log into the smart home application.

In exemplary embodiments, a smart home application may be used by terminals to control a plurality of smart devices with a display function. A server may provide services to the smart devices and the terminals. In order to enable each terminal to control a corresponding target smart device and acquire images, when a screenshot single is triggered, a terminal may acquire a user account that is used to log into a smart home application installed in the terminal. The terminal includes the user account and target smart device identifications in the screenshot request, and sends screenshot request to the server, so that the server can distinguish different terminals and the target smart devices controlled by the terminals according to the logged-in user accounts and the target smart device identification.

In some embodiments, the terminal 101 acquires a target smart device identification from the server 102. When receiving a display instruction to display a list of available smart devices that can be controlled by the terminal 101, the terminal 101 sends a device identification acquiring request to the server 102. The device identification acquiring request includes the logged-in user account. When receiving the device identification acquiring request, the server 102 acquires a plurality of corresponding smart device identifications from a stored database, based on the logged-in user account. The database includes corresponding relation between user accounts and smart device identifications. The server 102 sends the smart device identifications to the terminal 101. The terminal 101 displays the smart device identifications. After receiving a selection instruction of selecting a smart device identification from the smart device identifications, the terminal 101 determines the selected smart device identification as the target smart device identification.

The smart device identifications can be displayed on the terminal 101 in a list or others form that facilitate the user to view and select the smart device identifications. When the smart device identifications are to be displayed on the terminal 101 in a list, the server 102 can generate a list based on the smart device identifications for the terminal 101 to display. In some embodiments, the terminal 101 can generate a list based on the smart device identifications acquired from the server 102.

In some embodiments, one or more smart device identifications can be included in a screenshot request. Moreover, the selection instruction of selecting the specified smart device identification may be triggered by, for example, a predetermined operation or other automatic methods. The present disclosure is not limited to these examples.

In some embodiments, before sending the identification acquiring request to the server 102, the terminal 101 can correlate the user account to a plurality of smart devices having smart device identifications, so that the corresponding relation between the user account and the smart device identifications can be forwarded to and stored in the server 102. One of ordinary skill in the art can understand that various methods may be employed to correlate a user account to a plurality of smart devices, so that the details of applicable correlation methods are omitted therein.

In the illustrated embodiment, the logged-in user account is configured to allow a user to log in the smart home application, and is obtained after the user registers in the server 102. The server 102 corresponds to the smart home application. For example, the user account can include texts, numbers, letters, or punctuations, or combinations thereof. The present disclosure is not limited to these examples.

In the illustrated embodiment, the target smart device identification is a unique identification of the target smart device, which may be a smart device with a display function, such as a smart TV, a computer, a smart phone or the like. The target smart device identification may include, for example, a device name, the factory serial number, or the like of the target smart device. The present disclosure is not limited to these examples.

Figure 5:
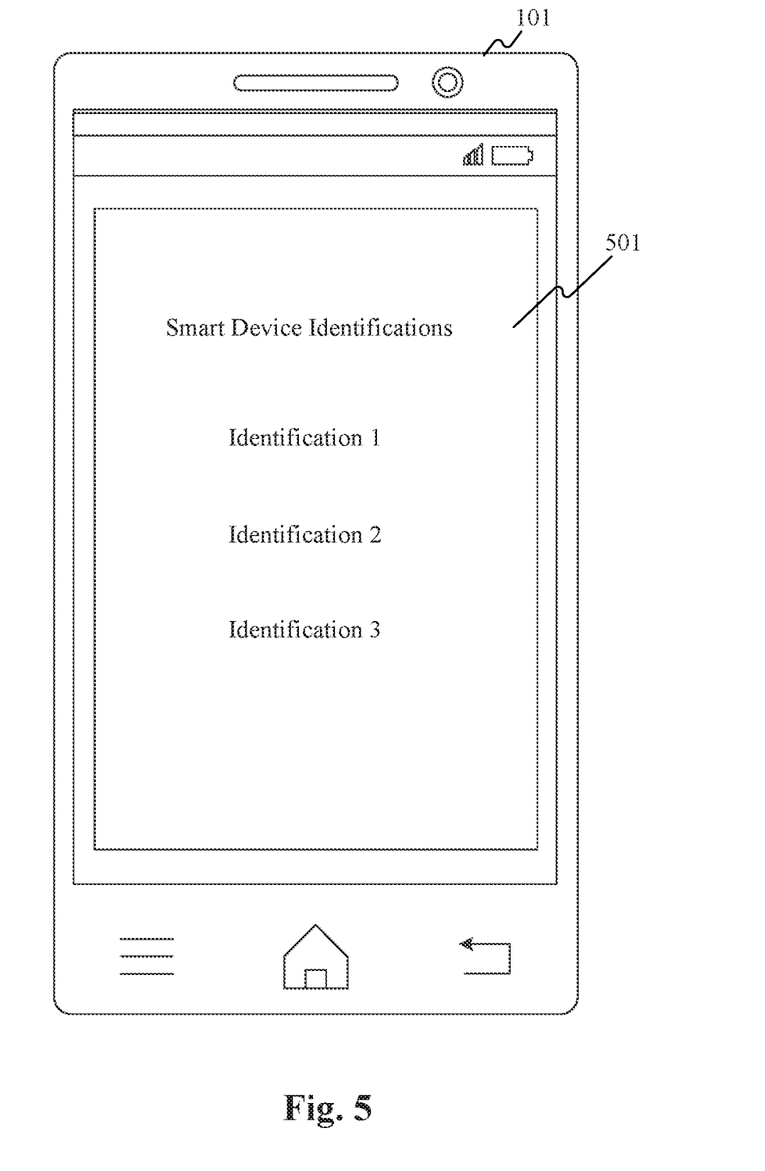
FIG. 5 illustrates a terminal displaying a display interface according to an exemplary embodiment of the present disclosure.

In one embodiment, when receiving a display instruction to display device identifications, the terminal 101 sends an identification acquiring request, including a user account "12354252," to the server 102. When the server 102 receives the identification acquiring request, it acquires a plurality of corresponding smart device identifications from a database, e.g., a table. An example database is shown in Table 1 illustrated below. Table 1 includes two user accounts and their corresponding smart device identifications. Referring to Table 1, Identification 1, Identification 2, and Identification 3 are corresponding to the user account "12354252." After the server 102 acquires the smart device identifications correspond to the user account, it sends the smart device identifications to the terminal 101. After receiving the smart device identifications, the terminal 101 displays them on an interface 501 as shown in FIG. 5. The terminal 101 determines, for example, the identification 2 as the target smart device identification after receiving a selection instruction of selecting the identification 2 in the interface 501.

TABLE 1

| User accounts | Smart device identifications |
|---|---|
| 12354252 | Identification 1 |
|  | Identification 2 |
|  | Identification 3 |
| 123233252 | Identification 4 |
|  | Identification 5 |

Although only two user accounts and five corresponding smart device identifications are shown in the Table 1, the present disclosure is not so limited. A database, e.g., a table, stored in a server may include more or fewer user accounts or smart device identifications.

Referring again to FIG. 3, in step 303, the server 102 sends the screenshot request to the target smart device 103 based on the user account and the target smart device identification when the server receives the screenshot request.

To enable the target smart device 103 to respond to the screenshot request from the terminal and send a screenshot image to the terminal 101, the server 102 can send the screenshot request to the target smart device 103 based on the user account and the target smart device identification.

In step 304, the smart device 103 performs a screenshot on an image displayed on the smart device to obtain a screenshot image when the target smart device 103 receives the screenshot request, and sends the screenshot image to the server 102.

In the illustrated embodiment, after receiving the screenshot request, the target smart device 103 can perform a screenshot on an image displayed on the target smart device 103 to obtain a screenshot image, and sends the screenshot image to the server 102.

To verify the validity of the screenshot request, before performing a screenshot on an image displayed on the target smart device 103, the target smart device 103 can acquire its own device identification, and compares its identification with the target smart device identification included the screenshot request. If they are the same, the target smart device 103 determines that the screenshot request is valid, and proceeds to obtain and send the screenshot to the server 102. If they are different, the target smart device 103 determines that the screenshot request is invalid, and ignores the screenshot request.

In some embodiments, after the screenshot image is obtained, the target smart device 103 can also acquire attribute information the screenshot image. For example, the attribute information of the screenshot image may include a time to take the screenshot image, an image resolution, an image format of the screenshot image, and the like. The target smart device 103 then sends the screenshot image and its attribute information to the server 102.

In some embodiments, the screenshot time acquired by the target smart device 103 may be used to verify the freshness of the screenshot image. For example, when a network connection between the target smart device 103 and the server 102 fails so that the target smart device 103 may be able to forward a screenshot image to the server 102, the server 102 can determine whether a screenshot image is the latest one according to the screenshot time of the screenshot image, so as to ensure the freshness of the screenshot image. In some embodiments, when the display resolution of the terminal 101 is different from that of the target smart device 103, the image resolution and the image format of the screenshot image are sent to the terminal 101 to help the terminal 101 to, for example, modify its display settings, so that the screenshot image can be displayed on the terminal 101 with clarity.

In step 305, the server 102 sends the screenshot image to the terminal 101 based on the user account after the server 102 receives the screenshot image from the target smart device 103.

A screenshot image may be lost or damaged in the sending, receiving, or storing processes. The image displayed on the target smart device 103 may appear only once. Sometimes the user may delete the screenshot image by mistake. To ensure the screenshot image may be acquired by the terminal 101, the server 102 is configured to store the screenshot image when the server 102 receives the screenshot image from the target smart device 102. In some embodiments, the server 102 can also store the screenshot image so that it corresponds to the user account in a database. For example, the database may be a table recording a corresponding relation between user accounts and screenshot images. Even if the screenshot image is deleted from the terminal 101 by mistake later, the terminal 101 may send a first re-acquiring request, including the user account, to the server 102 to acquire the screenshot stored therein. The server 102 can acquire the corresponding screenshot image from the database based on the corresponding relation between the user account and the screenshot images, and sends the requested screenshot image to the terminal 101.

The server 102 may store a plurality of screen shot images corresponding one user account. When the server 102 receives the first re-acquiring request for a screenshot image, it sends all corresponding screenshot images to the terminal 101, which may lead to waste of network resources when the terminal 101 needs only one of the screenshot images. It may also be difficult for the terminal 101 to identify the screenshot image it requests if multiple screenshot images taken by different smart devices are received from the server 102. To save the network resources and accurately acquire screenshot image(s) obtained by different smart devices, when receiving the screenshot images from the target smart devices 103, the server 102 can also store the user accounts, the target smart device identifications and corresponding screenshot images. If a screenshot image is accidentally deleted from the terminal 101 later, a second re-acquiring request, including the user account and the target smart device identification, can be sent to the server 102 to retrieve a requested screenshot image. The server 102 can acquire the corresponding screenshot image from the stored database based on the corresponding relation among the user accounts, the target smart device identifications, and the screenshot images, and sends the requested screenshot image to the terminal 101.

Table 2 shows a database in a form of a table stored by the server 102. For example, the user account "12354252" corresponds to three target smart device identifications, "Identification 1," "Identification 2," and "Identification 3." "Identification 1" corresponds to "Images 1 and 7." "Identification 2" corresponds to "Image 2." "Identification 3" corresponds to "Images 3 and 4." When the terminal 101 sends a second re-acquiring request including the user account "12354252" and target smart device identification "Identification 2" to the server 102, the server 102 can acquire "Image 2" based on the user account and the target smart device identification, and sends the screenshot image "Image 2" to the terminal 101.

TABLE 2

| Users accounts | Target smart device identifications | Screenshot images |
| --- | --- | --- |
| 12354252 | Identification 1 | Images 1 and 7 |
| | Identification 2 | Image 2 |
| | Identification 3 | Images 3 and 4 |
| 123233252 | Identification 4 | Image 5 |
| | Identification 5 | Image 6 |

In step 306, the terminal 101 receives the screenshot image sent from the server 102.

The terminal 101 can store the screenshot image when receiving the screenshot image sent from the server 102.

In some embodiments, when storing the screenshot image, the terminal 101 may select a storage format of the screenshot image, and may also perform editing operations, such as cropping, stretching, rotating, adjusting brightness or contrast, or the like, on the screenshot image. The present disclosure is not limited to these examples.

In the illustrated embodiment, a terminal can run a smart home application. After the smart home application is logged in with a user account, the user account can be correlated to a smart device. A server can store a corresponding relation between user accounts and smart device identifications. The terminal detects whether a screenshot signal is triggered. When it is detected that the screenshot signal is triggered, the terminal sends a screenshot request to the server. The server sends the screenshot request to a target smart device. The target smart device receives the screenshot request, performs a screenshot on an image displayed on the target smart device to obtain an image, and sends the screenshot image to the server. The server sends the screenshot image to the terminal, so that the terminal can fast and accurately acquire and store one or more images displayed on the target smart device. In some embodiments, the server also stores the screenshot image. If the screenshot image is lost or damaged in the sending, receiving or storage processes, the terminal can re-acquire the screenshot image from the server based on the use account, to improve efficiency of acquiring the screenshot image.

Figure 6:
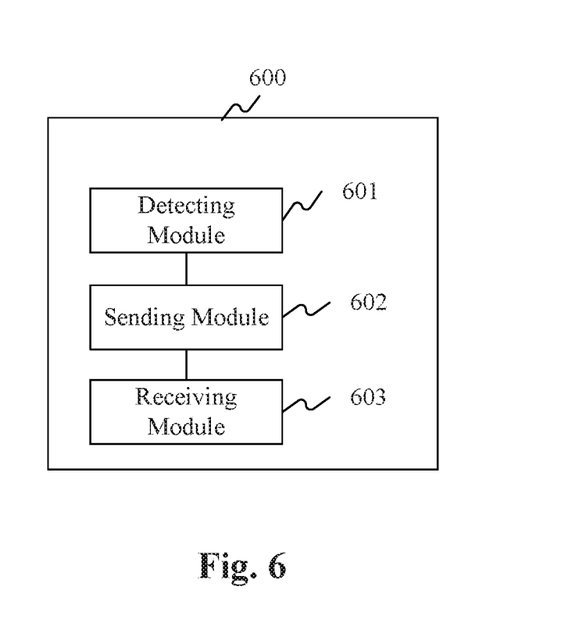
FIG. 6 is a block diagram of an image acquiring apparatus according to an exemplary embodiment of the present disclosure.

FIG. 6 is a block diagram of an image acquiring apparatus 600 according to an exemplary embodiment. The apparatus 600 is configured to perform one or more of the steps of the method 200. As shown in FIG. 6, the apparatus 600 includes a detecting module 601, a sending module 602, and a receiving module 603.

The detecting module 601 is configured to detect whether a screenshot signal is triggered.

The sending module 602 is configured to send a screenshot request to a server when the screenshot signal is triggered. The screenshot request includes user account information of a user account used to log into an application installed in the terminal and a target smart device identification, so as to enable the server to send the screenshot request to the target smart device based on the user account and the target smart device identification.

The receiving module 603 is configured to receive a screenshot image sent from the server and obtained by using the target smart device performing a screenshot on an image displayed on the target smart device based on the screenshot request.

Figure 7:
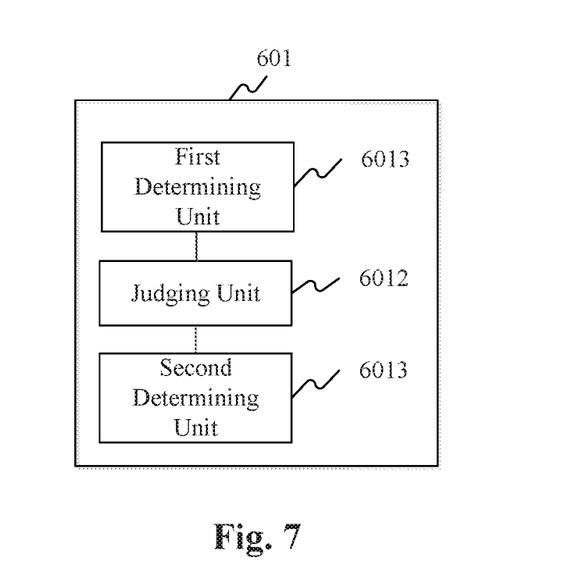
FIG. 7 is a block diagram of a detecting module according to an exemplary embodiment of the present disclosure.

FIG. 7 is a block diagram showing the detecting module 601 according to an exemplary embodiment of the present disclosure. In some embodiments, the detecting module 601 includes a first determining unit 6011 configured to determine that the screenshot signal is triggered when a smart home application which is logged in with the user account receives a screenshot instruction.

In some embodiments, as shown in FIG. 7, the detecting module 601 further includes a judging unit 6012 and a second determining unit 6013.

The judging unit 6012 is configured to judge whether the smart home application is in a running state when a specified operation is detected. In one embodiment, the smart home application is logged in with the user account.

The second determining unit 6013 is configured to determine that the screenshot signal is triggered when the smart home application is in the running state.

In some embodiments, the specified operation can be a shake operation, a knocking operation, or a specified hand gesture operation.

In the illustrated embodiment, the apparatus for acquiring images detects whether the screenshot signal is triggered. When the screenshot signal is triggered, the screenshot request is sent to a server to enable the server to send the screenshot request to a target smart device. The apparatus receives a screenshot image from the server, so that a user can fast and accurately acquire an image which the user wants to acquire by triggering the screenshot signal when the user finds the image on the target smart device. The apparatus 600 for acquiring an image can efficiently acquire an image the user desires to have.

The specific manners for performing functions or operations in individual modules have been described in detail in the embodiments regarding the related methods and will not be elaborated herein.

Figure 8:
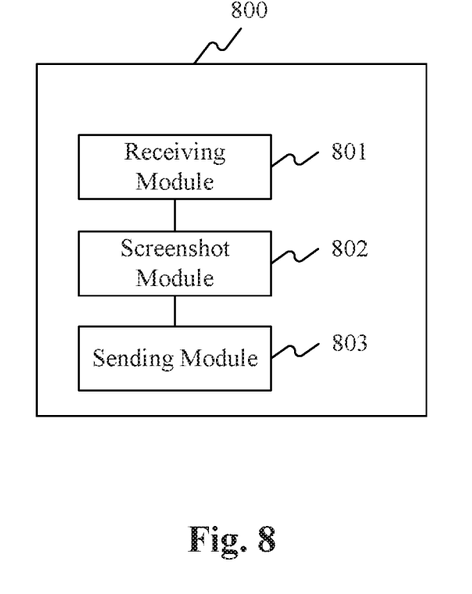
FIG. 8 is a block diagram of another image acquiring apparatus according to an exemplary embodiment of the present disclosure.

FIG. 8 is a block diagram of an image acquiring apparatus 800 according to an exemplary embodiment. The apparatus 800 may be a smart device, such as the smart device 103 shown in FIG. 1. As shown in FIG. 8, the apparatus 800 comprises a receiving module 801, a screenshot module 802, and a sending module 803.

The receiving module 801 is configured to receive a screenshot request sent from a server. The screenshot request was sent to the server by a terminal when it detects that a screenshot signal is triggered. The screen shot request includes an user account and a target smart device identification.

The screenshot module 802 is configured to perform a screenshot on an image displayed on the apparatus 800, based on the screenshot request to obtain a screenshot image.

The sending module 803 is configured to send the screenshot image to the server to enable the server to send the screenshot image to the terminal.

In some embodiments, before performing screenshot on the image displayed on the apparatus 800, the apparatus 800 can acquire its own device identification, and compares the its device identification with the target smart device identification included in the screenshot request. If they are the same, the apparatus 800 determines that the screenshot request is valid, and proceeds to obtain and send the screenshot to the server. If they are different, the apparatus 800 determines that the screenshot request is invalid, and ignores the screenshot request.

In some embodiments, after the screenshot image is obtained, the apparatus 800 can also acquire attribute information the screenshot image. For example, the attribute information of the screenshot image may include a time to take the screenshot image, an image resolution, an image format of the screenshot image, and the like. The apparatus 800 then sends the screenshot image and its attribute information to the server.

In some embodiments, the apparatus 800 can be a smart device, such as a smart TV, a computer, or the like with a display function.

In the illustrated embodiment, when receiving a screenshot request, which is sent by the terminal to the server when it is detected that the screenshot signal is triggered, the apparatus 800 performs screenshot on the image displayed thereon based on the screenshot request to obtain a screenshot image, and sends the screenshot image to the server to enable the server to send the screenshot image to the terminal. A user can fast and accurately acquire images displayed on a smart device when the user finds an image that the user wants to acquire on the smart device.

The specific manners for performing functions or operations in individual modules and apparatus 800 have been described in detail in the embodiments regarding the related methods and will not be elaborated herein.

Figure 9:
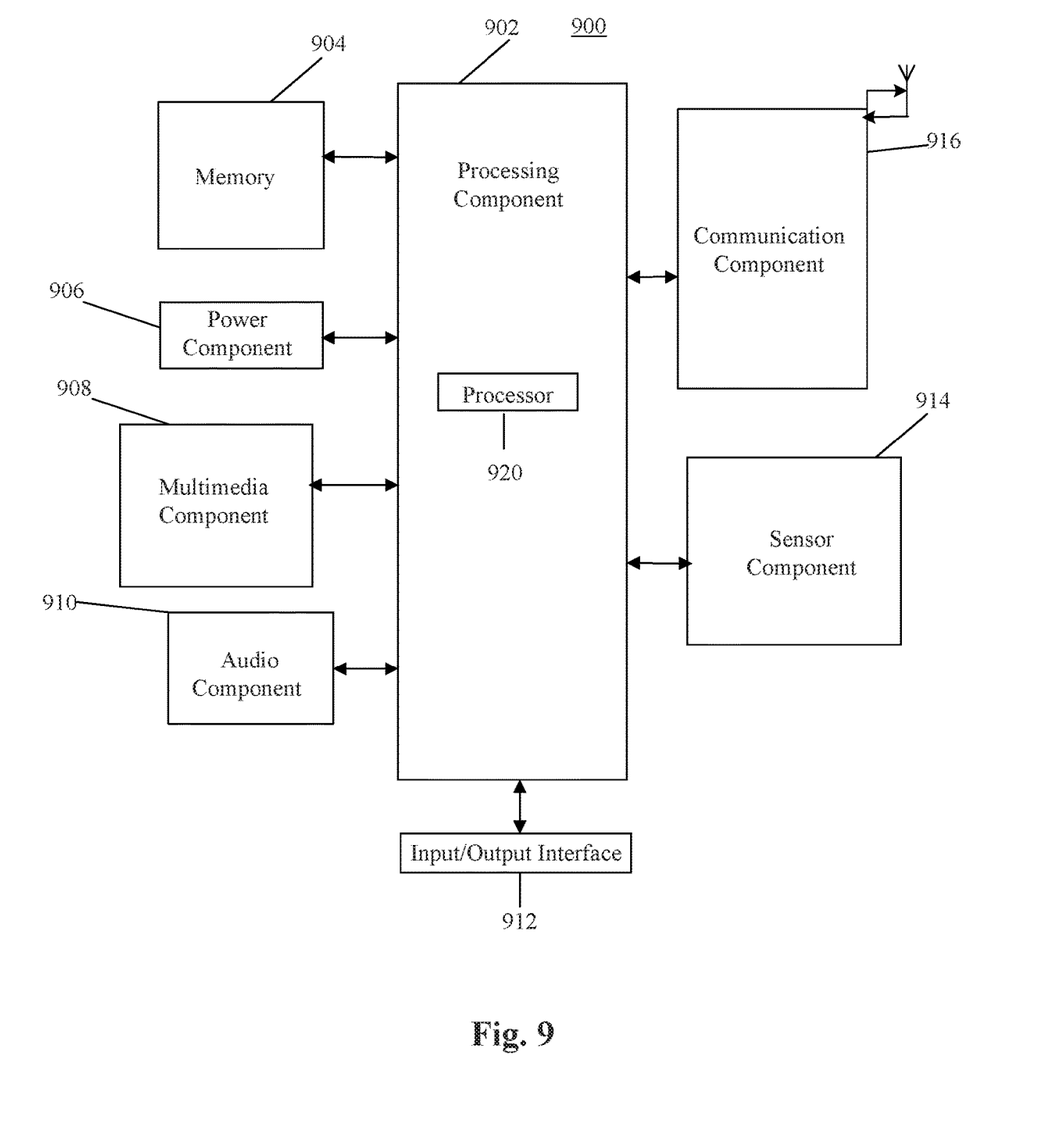
FIG. 9 is a block diagram of another image acquiring apparatus according to an exemplary embodiment of the present disclosure.

FIG. 9 is a block diagram of an image acquiring apparatus 900 consistent with embodiments of the present disclosure. For example, the apparatuses 600 and 800 shown in FIGS. 6 and 8, respectively, can be implemented in the apparatus 900. Referring to FIG. 9, the apparatus 900 may include one or more of the following components: a processing component 902, a memory 904, a power component 906, a multimedia component 908, an audio component 910, an input/output (I/O) interface 912, a sensor component 914, and a communication component 916.

The processing component 902 typically controls overall operations of the apparatus 900, such as the operations associated with display, telephone calls, data communications, camera operations, and recording operations. The processing component 902 may include one or more processors 920 to execute instructions to perform all or part of the steps in the above described methods. Moreover, the processing component 902 may include one or more modules which facilitate the interaction between the processing component 902 and other components. For instance, the processing component 902 may include a multimedia module to facilitate the interaction between the multimedia component 908 and the processing component 902.

The memory 904 is configured to store various types of data to support the operation of the apparatus 900. Examples of such data include instructions for any applications or methods operated on the apparatus 900, contact data, phonebook data, messages, images, video, etc. The memory 904 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 906 provides power to various components of the apparatus 900. The power component 906 may include a power management system, one or more power sources, and any other components associated with the generation, management, and distribution of power in the apparatus 900.

The multimedia component 908 includes a screen providing an output interface between the apparatus 900 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 908 includes a front camera and/or a rear camera. The front camera and the rear camera may receive an external multimedia datum while the apparatus 900 is in an operation mode, such as a photographing mode or a video mode. Each of the front camera and the rear camera may be a fixed optical lens system or have focus and optical zoom capability.

The audio component 910 is configured to output and/or input audio signals. For example, the audio component 910 includes a microphone configured to receive an external audio signal when the apparatus 900 is in an operation mode, such as a call mode, a recording mode, and a voice recognition mode. The received audio signal may be further stored in the memory 904 or transmitted via the communication component 916. In some embodiments, the audio component 910 further includes a speaker to output audio signals.

The I/O interface 912 provides an interface between the processing component 902 and peripheral interface modules, such as a keyboard, a click wheel, buttons, and the like. The buttons may include, but are not limited to, a home button, a volume button, a starting button, and a locking button.

The sensor component 914 includes one or more sensors to provide status assessments of various aspects of the apparatus 900. For instance, the sensor component 914 may detect an open/closed status of the apparatus 900, relative positioning of components, e.g., the display and the keypad, of the apparatus 900, a change in position of the apparatus 900 or a component of the apparatus 900, a presence or absence of user contact with the apparatus 900, an orientation or an acceleration/deceleration of the apparatus 900, and a change in temperature of the apparatus 900. The sensor component 914 may include a proximity sensor configured to detect the presence of nearby objects without any physical contact. The sensor component 914 may also include a light sensor, such as a CMOS or CCD image sensor, for use in imaging applications. In some embodiments, the sensor component 914 may also include an accelerometer sensor, a gyroscope sensor, a magnetic sensor, a pressure sensor, or a temperature sensor.

The communication component 916 is configured to facilitate communication, wired or wirelessly, between the apparatus 900 and other devices. The apparatus 900 can access a wireless network based on a communication standard, such as WiFi, 2G, 3G, or 4G, or a combination thereof. In one exemplary embodiment, the communication component 916 receives a broadcast signal or broadcast associated information from an external broadcast management system via a broadcast channel. In one exemplary embodiment, the communication component 916 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 900 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 904, executable by the processor 920 of the apparatus 900, for performing all or a portion of the above-described methods. For example, the non-transitory computer-readable storage medium may be a read-only memory (ROM), a random access memory (RAM), a CD-ROM, a magnetic tape, a floppy disc, an optical data storage device, or the like.

The present disclosure provides a non-transitory computer-readable storage medium storing instructions which, when executed by the processor 920, cause the apparatus 900 to perform all or a portion of the steps of the above methods.

It should be understood by those skilled in the art that the above described modules/units can each be implemented through hardware, or software, or a combination of hardware and software. One of ordinary skill in the art will also understand that multiple ones of the above described modules/units may be combined as one module/unit, and each of the above described modules/units may be further divided into a plurality of sub-modules/sub-units.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. An image acquiring method, comprising:
   detecting whether a screenshot signal is triggered in a terminal;
   sending a screenshot request from the terminal to a server when the screenshot signal is triggered, the screenshot request including a user account and a target smart device identification, so as to enable the server to:
      send the screenshot request to a target smart device based on the user account and the target smart device identification; and
      instruct the target smart device to perform a screenshot of an image displayed on the target smart device upon receiving the screenshot request; and
   receiving at the terminal a screenshot image from the server, the screenshot image being sent from the server based on a corresponding relation among user accounts, target smart device identifications and screenshot images, the screenshot image being obtained and provided to the server by the target smart device in response to the screenshot request.

2. The method of claim 1, wherein the detecting whether the screenshot signal is triggered comprises:
   determining that the screenshot signal is triggered when an application which is logged in with the user account receives a screenshot instruction.

3. The method of claim 1, wherein the detecting whether the screenshot signal is triggered comprises:
   judging whether an application which is logged in with the user account is in a running state when a specified operation is detected; and
   determining that the screenshot signal is triggered when the application is in the running state.

4. The method of claim 3, wherein the specified operation is one of a shake operation, a knocking operation, or a hand gesture operation.

5. The method of claim 1, wherein:
   the terminal is installed with a smart home application, and communicates with the server via the smart home application, so as to control the target smart device;
   the server is configured to transmit signals between the terminal and the target smart device; and
   the target smart device receives control information sent from the terminal via the server, so as to perform a corresponding control operation.

6. An image acquiring terminal, comprising:
   a processor; and
   a memory configured to store instructions executable by the processor,
   wherein the processor is configured to:
      detect whether a screenshot signal is triggered;
      send a screenshot request to a server when the screenshot signal is triggered, the screenshot request including a user account and a target smart device identification, so as to enable the server to:
         send the screenshot request to a target smart device based on the user account and the target smart device identification; and
         instruct the target smart device to perform a screenshot of an image displayed on the target smart device upon receiving the screenshot request; and
      receive a screenshot image from the server, the screenshot image being sent from the server based on a corresponding relation among user accounts, target smart device identifications and screenshot images, the screenshot image being obtained and provided to the server by the target smart device in response to the screenshot request.

7. The terminal of claim 6, wherein the processor is further configured to: determine that the screenshot signal is triggered when an application which is logged in with the user account receives a screenshot instruction.

8. The terminal of claim 6, wherein the processor is further configured to:
   judge whether an application which is logged in with the user account is in a running state when a specified operation is detected; and
   determine that the screenshot signal is triggered when the application is in the running state.

9. The terminal of claim 8, wherein the specified operation can be one of a shake operation, a knocking operation, or a hand gesture operation.

10. The terminal of claim 6, wherein:
    the terminal is installed with a smart home application, and communicates with the server via the smart home application, so as to control the target smart device;
    the server is configured to transmit signals between the terminal and the target smart device; and
    the target smart device receives control information sent from the terminal via the server, so as to perform a corresponding control operation.

11. A target smart device, comprising:
    a processor; and
    a memory configured to store instructions executable by the processor,
    wherein the processor is configured to:
       receive a screenshot request from a server when a screenshot signal is triggered in a terminal, the screenshot request including a user account and a target smart device identification, so as to enable the server to send the screenshot request to the target smart device based on the user account and the target smart device identification;
       perform a screenshot on an image displayed on the target smart device in response to the screenshot request to obtain a screenshot image; and
       send the screenshot image to the server.

* * * * *